US009097336B2

(12) United States Patent
Block et al.

(10) Patent No.: US 9,097,336 B2
(45) Date of Patent: Aug. 4, 2015

(54) DEVICE FOR CONTROLLING A HYDRAULIC ACCUMULATOR OF A HYDRAULIC SYSTEM

(75) Inventors: Ruediger Block, Korntal-Muenchingen (DE); Nils Steinbach, Bietigheim-Bissingen (DE); Werner Hess, Stuttgart (DE); Ianislav Krastev, Ludwigsburg (DE); Helmut Schneider, Aichtal (DE); Steffen Strauss, Rutesheim (DE); Uwe Kulow, Ludwigsburg (DE); Christof Ott, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 208 days.

(21) Appl. No.: 13/878,363

(22) PCT Filed: Sep. 8, 2011

(86) PCT No.: PCT/EP2011/065541
§ 371 (c)(1),
(2), (4) Date: Jul. 12, 2013

(87) PCT Pub. No.: WO2012/045546
PCT Pub. Date: Apr. 12, 2012

(65) Prior Publication Data
US 2013/0284289 A1    Oct. 31, 2013

(30) Foreign Application Priority Data

Oct. 8, 2010    (DE) .................. 10 2010 042 189

(51) Int. Cl.
*F16K 21/04*    (2006.01)
*F16H 61/00*    (2006.01)
(Continued)

(52) U.S. Cl.
CPC ............ *F16H 61/0009* (2013.01); *F15B 1/027* (2013.01); *F15B 13/0431* (2013.01); *F16H 61/0025* (2013.01); *F16H 2061/0034* (2013.01)

(58) Field of Classification Search
CPC .................... F16H 61/0009; F16H 2061/0034
USPC ............ 137/601.14, 601.18, 601.2; 180/165; 60/413
See application file for complete search history.

(56) References Cited

U.S. PATENT DOCUMENTS

| 4,813,510 A | * | 3/1989 | Lexen ........................... 180/165 |
| 5,293,789 A | | 3/1994 | Goto et al. |

(Continued)

FOREIGN PATENT DOCUMENTS

| DE | 14 26 593 | 9/1969 |
| DE | 10 2006 014 756 | 10/2007 |

(Continued)

OTHER PUBLICATIONS

International Search Report, International Application No. PCT/EP2011/065541, dated Nov. 10, 2011.

*Primary Examiner* — John K Fristoe, Jr.
*Assistant Examiner* — Reinaldo Sanchez-Medina
(74) *Attorney, Agent, or Firm* — Kenyon & Kenyon LLP (57) ABSTRACT

A device is described for controlling a hydraulic accumulator of a hydraulic system, for example a vehicle transmission, having a valve device which may connect and disconnect an accumulator-side port of the device to and from a system-side port, the valve device including at least one first check valve which is situated hydraulically between the accumulator-side port and the system-side port, and which is blocking in the direction of the system-side port, the valve device also including an electrically actuated control valve which is situated between a control port of the first check valve and the accumulator-side port in such a way that the control valve may hydraulically unblock the first check valve, using the pressure prevailing at the accumulator-side port.

9 Claims, 8 Drawing Sheets

(51) Int. Cl.
*F15B 1/027* (2006.01)
*F15B 13/043* (2006.01)

(56) References Cited

U.S. PATENT DOCUMENTS

| | | | |
|---|---|---|---|
| 5,494,012 | A | 2/1996 | Hagen |
| 7,047,931 | B2 | 5/2006 | Sluka et al. |
| 7,798,271 | B2 | 9/2010 | Schiele et al. |
| 8,056,666 | B2 | 11/2011 | Portell et al. |
| 2005/0096171 | A1 | 5/2005 | Brown et al. |
| 2007/0012038 | A1* | 1/2007 | Bitter .......................... 60/413 |
| 2008/0078286 | A1 | 4/2008 | Gray |
| 2010/0216594 | A1 | 8/2010 | Hendrickson et al. |
| 2011/0146820 | A1* | 6/2011 | Frerichs et al. .......... 137/565.11 |

FOREIGN PATENT DOCUMENTS

| | | |
|---|---|---|
| DE | 10 2006 014 758 | 10/2007 |
| DE | 10 2006 041 899 | 3/2008 |
| DE | 10 2009 047 828 | 4/2010 |
| EP | 1 353 075 | 10/2003 |
| EP | 1 265 009 | 1/2008 |
| JP | 10-250402 | 9/1998 |
| JP | 2007-138993 | 6/2007 |

* cited by examiner

DEVICE FOR CONTROLLING A HYDRAULIC ACCUMULATOR OF A HYDRAULIC SYSTEM

FIELD

The present invention relates to a device for controlling a hydraulic accumulator of a hydraulic system.

BACKGROUND INFORMATION

Conventional start-stop functions for motor vehicles are used with internal combustion engines to be automatically turned off by a control unit when the vehicle is at a standstill. This may help save fuel in a range from approximately 3% to approximately 5%.

Automatic transmissions, for example a stepped transmission, a dual-clutch transmission or continuously variable transmissions, are generally activated hydraulically and require a hydraulic pressure and a hydraulic volumetric flow for operation. The latter is provided by a mechanical pump (i.e., one driven by the internal combustion engine), the pump generally having an overdimensioned design due to the linear dependency of the volumetric flow on the rotational speed and due to reserves provided for taking into account the idling speed of the internal combustion engine and a possibly high oil temperature.

A system pressure controller sets a constant hydraulic pressure in the automatic transmission, and an excess amount of fluid is fed back into a tank or accumulator. Conventionally, the pump has a mechanically variable design (e.g., with the aid of an adjustment of the eccentricity of a vane pump), which may result in fuel savings.

When the internal combustion machine is stopped during the stopping phase, and when the hydraulic pump is stopped, the transmission may no longer be supplied with sufficient pressure or sufficient volumetric flow. Since the hydraulic circuit has certain leaks, the clutches and brakes are placed in an unpressurized (i.e., generally opened) position with the aid of restoring springs.

When the internal combustion engine restarts, it takes a certain amount of time before the mechanical pump generates enough pressure again. This results in a corresponding time delay before a starting torque is transmittable via the clutches. In addition, undesirable torque jumps may result when the clutches engage uncontrolled or slip. Furthermore, these clutches are generally not designed for the loads which occur.

To correct this, an electrically activated, on-demand oil pump may be used, which appropriately supplements the oil or hydraulic fluid in the transmission either continuously or shortly before the internal combustion engine starts. An alternative approach is to use an accumulator component. This component has the function of supplying an absent quantity of oil to the transmission shortly before or during the startup of the internal combustion engine, for the purpose of filling the lines and the transmission or the clutches.

In a conventional approach, a spring piston accumulator—for example, one having a capacity of approximately 100 ml (milliliters)—is mechanically latched in the filled state during the stopping phase and is charged by the hydraulic pump during normal vehicle operation. The charging point in time may not be influenced, since fluid flows from the transmission hydraulic circuit to the accumulator via a filling throttle as a function of the pump pressure as early as shortly after the engine starts up (i.e., at low rotational speeds).

During the stopping phase of the internal combustion engine, a solenoid of a valve controlling the fluid exchange is energized. Before and during the restart of the internal combustion engine, when the rotational speed rises continuously, the detent is released by de-energizing the solenoid, whereby a hydraulic pressure and an adequate quantity of fluid are provided for the transmission. The emptied cavities of the hydraulic circuit are filled, so that the pressure buildup by the mechanical pump takes place rapidly, and the motor vehicle may start up without a noticeable delay.

One general approach is to combine, e.g., any type of hydraulic accumulator (for example, a gas piston accumulator, a spring piston accumulator, a gas diaphragm accumulator having a barrier layer) in connection with an electrohydraulic valve (such as a 2/2-way valve). The accumulator is charged with fluid by the transmission oil pump during normal vehicle operation. During the stopping phase, the accumulator continues to store the fluid and may discharge it to the transmission or the hydraulic system shortly before and/or during the starting phase.

The valve must meet strict requirements with regard to tightness, fluid (medium) contamination and the required flow rate. For example, it may be required to achieve a flow rate of 30 liters per minute for a period of 200 ms (milliseconds). When charging the accumulator, it must also be kept in mind that the volumetric flow is limited, for example to approximately 3 liters per minute, so that the pressure in the transmission system does not drop due to the "absent" volumetric flow, or the mechanical transmission oil pump would possibly have to be more generously dimensioned.

The following describe systems in this field: DE 10 2006 041 899 A1, DE 10 2006 014 756 A1, DE 10 2006 014 758 A1, JP 10250402 A, U.S. Pat. No. 5,293,789 A1, EP 1 265 009 B1, US 20,050,096,171 A1, EP 1 353 075 A2 and JP 2007138993 A.

SUMMARY

Features which may be important for the present invention are described below and shown in the figures; the features may be important for the present invention both alone and in different combinations without explicit reference being made again thereto.

The present invention has the advantage that a hydraulic accumulator of a hydraulic system, in particular in automatic transmissions, may be emptied in a controlled manner—and in at least one embodiment also filled in a controlled manner—for carrying out a start-stop function of an internal combustion engine, the wear and susceptibility to contamination being minimal and an electrical energy consumption also being minimal. An example device according to the present invention operates reliably and cost-effectively and may also be manufactured comparatively easily.

In accordance with the present invention, a hydraulic accumulator of a hydraulic system, such as for industrial hydraulic applications or in automotive engineering—for example, for the engine oil circuit or the vehicle transmission—is to be filled and emptied in a controlled manner. For this purpose, according to an example embodiment of the present invention, a comparatively simple check valve may be used, which is unblockable by a control valve. The example device constructed in this way may be designed in different embodiments, which may result in additional improvements with regard to a desired behavior of the device.

The example device includes an accumulator-side port and a system-side port. The first check valve is situated hydraulically between the accumulator-side port and the system-side port, and it is blocking in the direction of the system-side port. In a basic form of the present invention, a pressure in the hydraulic system may open the first check valve and fill the hydraulic accumulator with a portion of the fluid present in the hydraulic system, if the pressure is greater than a pressure in the hydraulic accumulator. When the pressure in the hydraulic accumulator rises and approximately reaches the pressure of the hydraulic system, the first check valve may be blocking. Conversely, when the hydraulic accumulator is to be subsequently emptied to compensate for a possible pressure loss or fluid loss in the hydraulic system, according to the present invention, a control port of the first check valve is actuated with the aid of a control valve in such a way that a pressure of the fluid prevailing in the hydraulic accumulator unblocks the first check valve. The control valve is electrically actuatable and is situated between a control port of the first check valve and the accumulator-side port.

The device according to the present invention may be designed in such a way that it generally includes only two so-called leak paths. A first leak path occurs at the valve seat of the control valve, and a second leak path occurs at the valve seat of the first check valve.

One embodiment of the device provides that the device has a second check valve which is in line with the first check valve and is situated between the first check valve and the system-side port and which is blocking in the direction of the first check valve, and the device also has a bypass situated in parallel to the second check valve, in which a volumetric flow-limiting element is situated. The volumetric flow-limiting element may be designed as a throttle or a diaphragm and, for the sake of simplicity, is always referred to below as "throttle" or "flow throttle." A throttle has the advantage over a diaphragm that the volumetric flow may be limited comparatively independently of the temperature of the fluid. As a result, the function of the device may be improved in that a filling operation of the hydraulic accumulator is not dependent only on a pressure increase of the hydraulic system with regard to the hydraulic accumulator, but instead is also determined by the bypass via which a controlled filling of the hydraulic accumulator may take place. In particular, a cross section of the bypass limits the amount of fluid flowing to the hydraulic accumulator to a preset value. This is accomplished by the flow throttle situated in the bypass.

If the hydraulic accumulator is to be at least partially emptied in the opposite direction, the second check valve may open after the first check valve is unblocked, which enables fluid to subsequently flow unhindered and unthrottled into the hydraulic system.

Another embodiment of the device provides that the device includes a hydraulic connection which connects the control port of the first check valve to the system-side port, a volumetric flow-limiting element, for example a throttle or a diaphragm, and preferably a filter being serially situated in the hydraulic connection. An effective cross section of the volumetric flow-limiting element comparatively greatly influences the behavior of the device during filling or emptying of the hydraulic accumulator. Different requirements may result when filling or emptying the hydraulic accumulator.

Yet another embodiment of the device provides that a second check valve is situated in parallel to the volumetric flow-limiting element, which is blocking in the direction of the system-side port. The device may thus be effectively improved in that a decoupling, so to speak, takes place between the filling operation and the emptying operation of the hydraulic accumulator. If sufficient hydraulic pressure prevails in the hydraulic system, the second check valve may open in the direction of the control port of the unblockable check valve or in the direction of the control valve or in the direction of the hydraulic accumulator. In this way, it is achieved that the fluid flow for filling the hydraulic accumulator is generally determined by an effective cross section of the control valve. Due to the second check valve, the comparatively small effective cross section of the volumetric flow-limiting element may be bypassed. When emptying the hydraulic accumulator, the second check valve is closed, and the volumetric flow-limiting element limits the fluid flow from the control area of the unblockable check valve in the direction of the system-side port. This advantageously makes it possible for the effective cross section of the volumetric flow-limiting element to be comparatively small, so that the hydraulic pressure in the control area of the unblockable check valve decreases by a comparatively small amount.

The example device may have a simpler configuration if the second check valve and the volumetric flow-limiting element are situated in a valve element of the first check valve or in a bypass channel of the first check valve. For example, the second check valve and the volumetric flow-limiting element as well as the filter may be situated in a piston of the first check valve. This makes it possible to provide a particularly compact design, which may save installation space and makes the manufacture of the device cheaper.

According to the present invention, it is furthermore provided that a spring piston accumulator, a gas piston accumulator or a gas diaphragm accumulator having a barrier layer is connectable to the accumulator-side port of the device. Different accumulator types of hydraulic accumulators, in particular pressure accumulators, are described thereby. In the embodiments described above, the example device according to the present invention is connectable to such accumulators for the purpose of the controlled exchange of fluid with the hydraulic system.

The device according to the present invention requires less electrical energy if the control valve is blocked in the de-energized state. The present invention is directed to the consideration that the hydraulic accumulator is emptied during comparatively short time segments during operation of the hydraulic system. Accordingly, the hydraulic device is designed in such a way that no or very little fluid is supplied to the hydraulic system in a de-energized state of the hydraulic accumulator. The possible applications of the device may be advantageously expanded thereby, and the costs of the electrical system are lowered.

BRIEF DESCRIPTION OF THE DRAWINGS

Exemplary specific embodiments of the present invention are explained below with reference to the figures.

DETAILED DESCRIPTION OF EXAMPLE EMBODIMENTS

The same reference numerals are used for functionally equivalent elements and variables in all figures, even in different specific embodiments.

Figure 1:
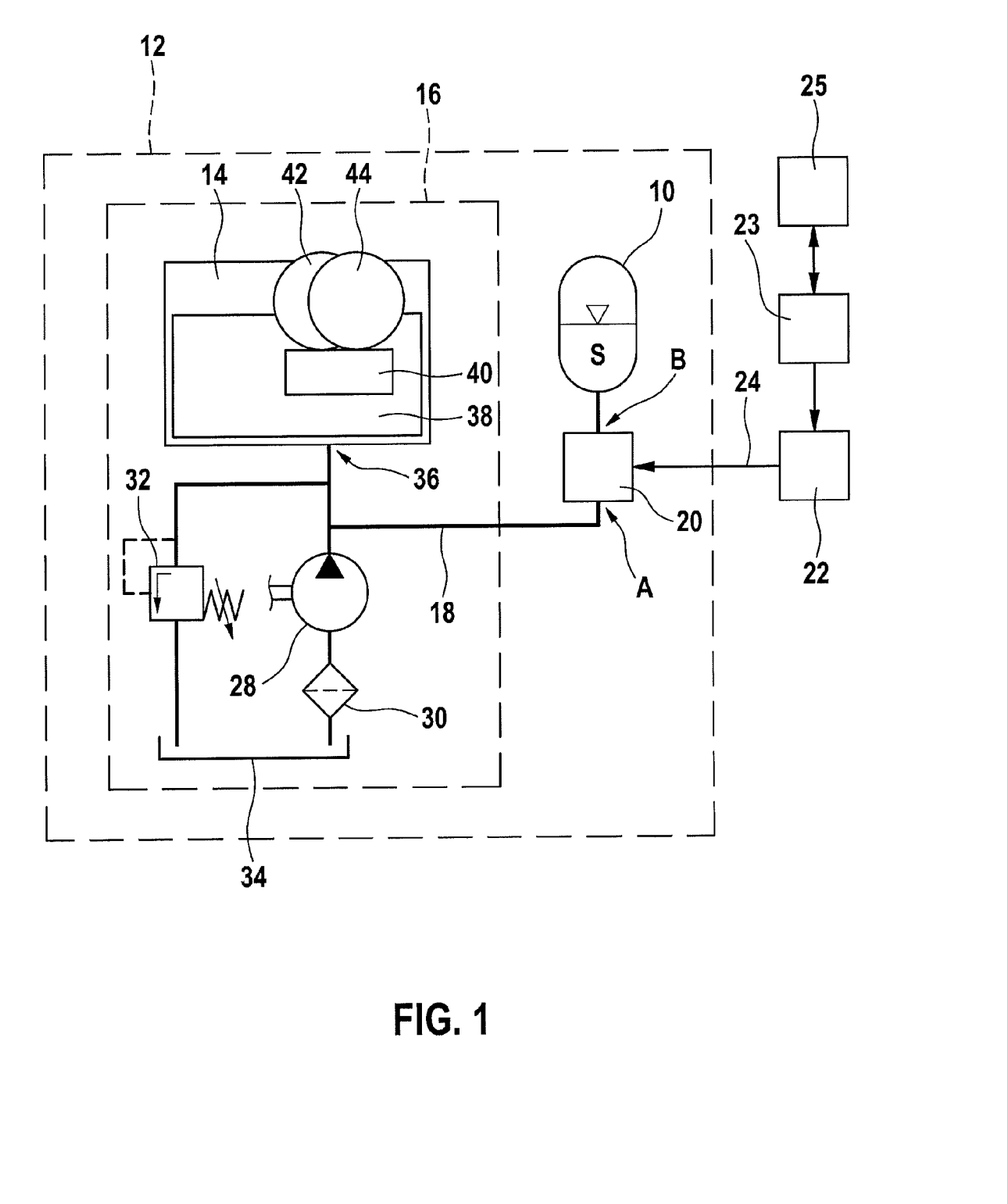
FIG. 1 shows a schematic representation of a hydraulic system of an automatic transmission having a hydraulic accumulator.

FIG. 1 shows a simplified schematic representation of a configuration of a hydraulic accumulator 10 in a hydraulic system 12 of an automatic transmission 14 of a motor vehicle, which is not illustrated in further detail herein. Hydraulic accumulator 10, which in the present case is a pressure accumulator 10, is connected to remaining hydraulic system 16 via a hydraulic connection 18 with the aid of a device 20. Device 20 is electromagnetically actuatable by a first control and/or regulating device 23 of the motor vehicle with the aid of an output stage 22. This is indicated symbolically by an arrow 24. First control and/or regulating device 23 is, for example, an engine control unit or a transmission control unit. In the present case, first control and/or regulating device 23 is also connected to a second control and/or regulating device 25 via a bidirectional communication channel. Device 20 has a system-side port A and an accumulator-side port B for exchanging fluid.

Furthermore, a hydraulic pump 28, a hydraulic filter 30 and a controller 32 for regulating the system pressure are situated in hydraulic system 12. Hydraulic pump 28 is driven by the internal combustion engine of the motor vehicle and fed from a reservoir 34 which is connected to an output of controller 32.

A port 36 connects the described assembly to automatic transmission 14, which is substitutionally represented in the drawing in FIG. 1 by a hydraulic control system 38 and valves 40, clutches 42 and brakes 44 included therein.

Hydraulic system 12 is a closed system. Accordingly, it may be necessary to keep a volume and a pressure of the fluid located therein within certain limits. In the present motor vehicle, which may be operated in a start-stop mode, the volume and the pressure of the fluid may, in particular, vary particularly greatly and rapidly. Pressure accumulator 10 is used primarily to store and provide hydraulic pressure if hydraulic pump 28 was turned off during a stopping mode.

The start-stop function of the internal combustion engine may help save fuel. While the internal combustion engine is running, for example, the stopping mode may be triggered when the vehicle has come to a standstill for a predefinable period of time while the (foot) brake is actuated at the same time. Upon subsequent release of the brake, the internal combustion engine is automatically restarted.

Device 20 and hydraulic accumulator 10 are designed to permit an exchange of fluid between hydraulic accumulator 10 and remaining hydraulic system 16, depending on an operating mode of the motor vehicle. During normal operation of the motor vehicle, hydraulic pump 28 is in operation and enables hydraulic accumulator 10 to be filled with fluid. In a stopping mode of the motor vehicle, however, hydraulic pump 28 is not in operation. Therefore, pressure losses which make startup difficult may occur in hydraulic system 12—for example, as a result of leaks.

Shortly before and/or during a starting phase of the internal combustion engine of the motor vehicle, which follows the stopping mode, fluid may be introduced from hydraulic accumulator 10 into remaining hydraulic system 16 with the aid of device 20. This may take place comparatively quickly and using a small amount of energy. If a necessary operating pressure is subsequently reached in hydraulic system 12, due to the action of hydraulic pump 28, hydraulic accumulator 10 may conversely be refilled from remaining hydraulic system 16. This may take place comparatively slowly. Hydraulic accumulator 10 in FIG. 1 may be designed as a spring piston accumulator, a gas piston accumulator or a gas diaphragm accumulator having a barrier layer.

Figure 2:
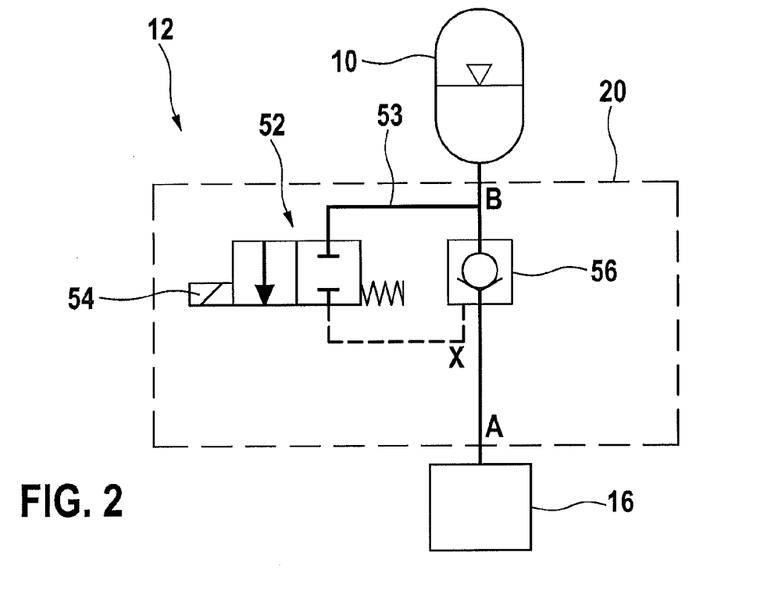
FIG. 2 shows a first specific embodiment of a device for controlling the hydraulic accumulator.

FIG. 2 shows device 20 for controlling hydraulic accumulator 10 of hydraulic system 12 in a fundamental and particularly simple specific embodiment. In the present case, device 20 includes a control valve 52 which is actuatable with the aid of electromagnet 54 as well as a first check valve 56, which is blocking in the direction of hydraulic system 12 and which has a control port X. Accumulator-side port B of device 20 is hydraulically connected to hydraulic accumulator 10, and system-side port A of device 20 is hydraulically connected to remaining hydraulic system 16.

First check valve 56 is blocked when the hydraulic pressure in hydraulic accumulator 10 is greater than the hydraulic pressure in remaining hydraulic system 16, so that no fluid is able to flow from hydraulic accumulator 10 into remaining hydraulic system 16. However, if electromagnet 54 of control valve 52 is actuated in this state, control valve 52 opens so that fluid is able to flow from hydraulic accumulator 10 to control port X of first check valve 56 via control valve 52. First check valve 56 is unblocked thereby, so that fluid may flow from hydraulic accumulator 10 into remaining hydraulic system 16 as a result of the comparatively high pressure.

A possible pressure loss and/or fluid loss in remaining hydraulic system 16 may be compensated in this way by the fluid present in hydraulic accumulator 10, which is controlled by control valve 52. If the pressure in remaining hydraulic system 16 continues to rise in a subsequent operating phase, so that this pressure is greater than the pressure in hydraulic accumulator 10, the pressure prevailing in remaining hydraulic system 16 is applicable to first check valve 56 counter to the blocking direction, and the check valve may open.

In this way, device 20 may permit the filling, emptying and holding of fluid pressure in hydraulic accumulator 10. Device 20 may thus support the start-stop function of the internal combustion engine in the motor vehicle.

Figure 3:
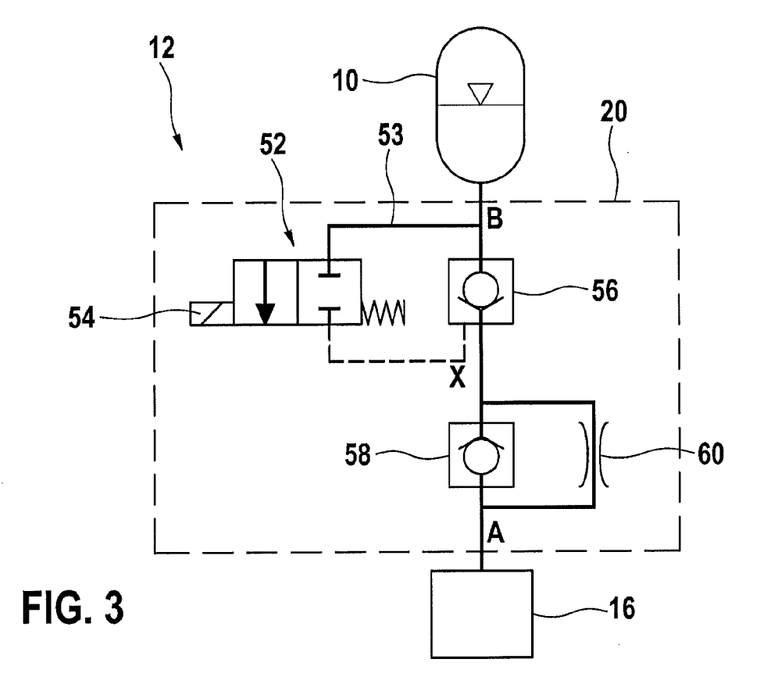
FIG. 3 shows a second specific embodiment of the device.

FIG. 3 shows an expanded specific embodiment of device 20, compared to FIG. 2. A second check valve 58, which is blocking in the direction of first check valve 56, and a flow throttle 60, which is located parallel to second check valve 58 as a volumetric flow-limiting element, are situated between the port of unblockable check valve 56 provided at a distance from hydraulic accumulator 10 and system-side port A.

In the specific embodiment in FIG. 3, it is apparent that flow throttle 60 controls the filling of hydraulic accumulator 10. The volume of fluid flowing into hydraulic accumulator 10 is determined by the pressure difference prevailing between hydraulic accumulator 10 and remaining hydraulic system 16 and by the effective cross section of flow throttle 60.

In the opposite case, in which the pressure in hydraulic accumulator 10 is greater than the pressure in remaining hydraulic system 16, first check valve 56 being unblocked with the aid of control valve 52, no great difference is present, compared to the configuration according to FIG. 2. In the event that hydraulic accumulator 10 is emptied, second check valve 58 opens counter to the blocking direction as a result of the pressure difference and permits a comparatively large exchange of fluid in the direction of remaining hydraulic system 16.

Figure 4:
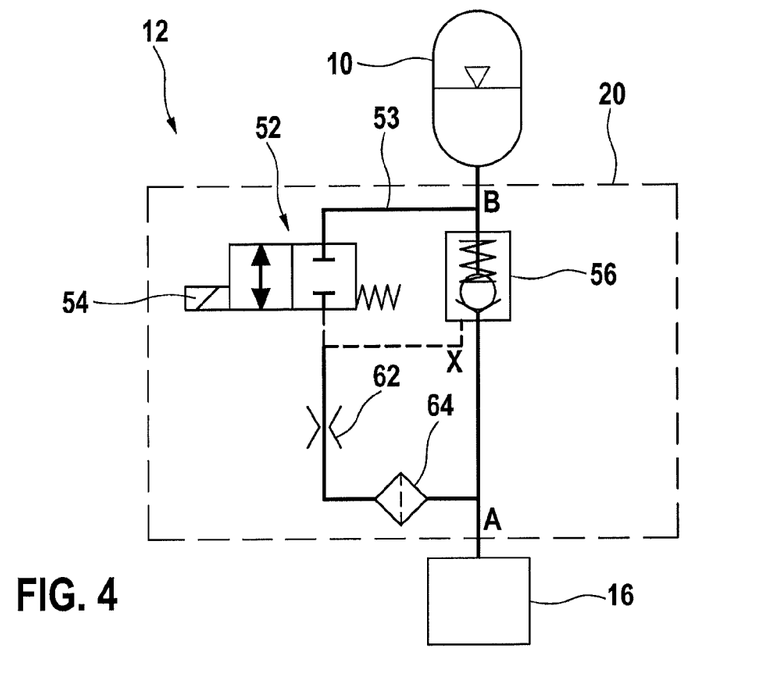
FIG. 4 shows a third specific embodiment of the device.

FIG. 4 shows an alternative enhancement of FIG. 2. The specific embodiment illustrated in FIG. 4 includes a hydraulic connection which connects control port X of first check valve 56 to system-side port A, a throttle 62 as the volumetric flow-limiting element and a filter 64 being serially situated in the hydraulic connection.

An effective cross section of throttle 62 has a comparatively great influence on the behavior of device 20 while filling or emptying hydraulic accumulator 10. Different requirements may result when filling or emptying hydraulic accumulator 10.

Figure 5:
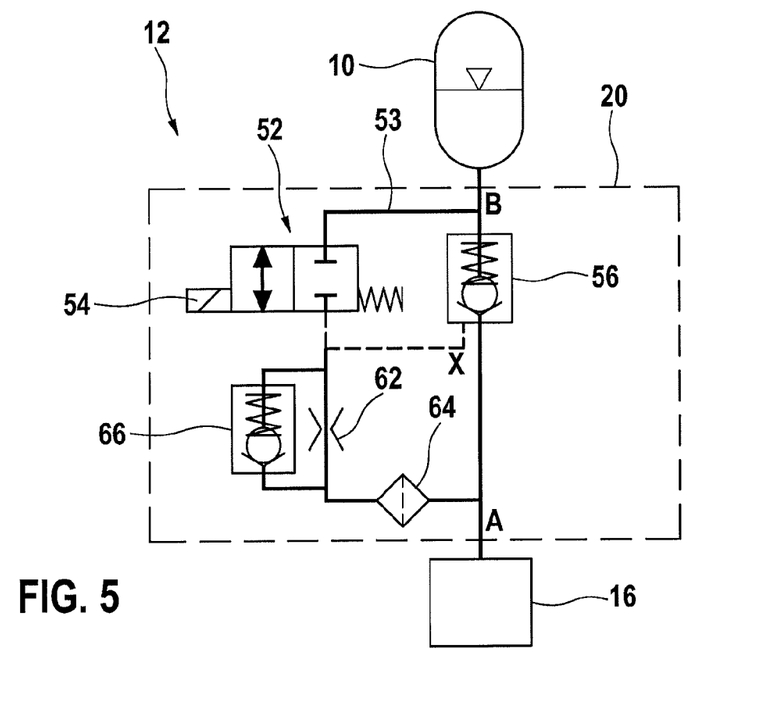
FIG. 5 shows a fourth specific embodiment of the device.

FIG. 5 shows an enhancement of device 20 according to FIG. 4. In the illustrated specific embodiment according to FIG. 5, a second check valve 66 is situated in parallel to throttle 62, second check valve 66 blocking in the direction of system-side port A. Check valve 66 has a hydraulic cross section which is at least equal to but usually larger than that of throttle 62. In the present case, the hydraulic connection between accumulator-side port B and control valve 52 is designed as a bypass channel 53, which is explained in greater detail in FIG. 8.

Device 20 according to FIG. 2 may thus be effectively improved in that a decoupling, so to speak, takes place between the filling operation and the emptying operation of hydraulic accumulator 10. If sufficient pressure prevails in remaining hydraulic system 16, second check valve 66 may open in the direction of control port X of first check valve 56 or in the direction of control valve 52 or in the direction of hydraulic accumulator 10. In this way, it is achieved that the fluid flow for filling hydraulic accumulator 10 is generally determined by an effective cross section of control valve 52. The comparatively small effective cross section of throttle 62 may be bypassed by second check valve 66.

During emptying of hydraulic accumulator 10, second check valve 66 is closed, and throttle 62 limits the fluid flow from the control area of first check valve 56 in the direction of system-side port A. This advantageously makes it possible for the effective cross section of throttle 62 to be comparatively small, so that the hydraulic pressure in the control area of first (unblockable) check valve 56 comparatively drops a little.

Hydraulic accumulator 10 may be filled in a controlled manner with the aid of device 20 in FIG. 5 by actuating control valve 52—if a higher pressure prevails at system-side port A with regard to accumulator-side port B—the resulting volumetric flow largely depending on the opening cross section of control valve 52. If, in the opposite case, the pressure at accumulator-side port B is greater with regard to system-side port A, hydraulic accumulator 10 may, in turn, be emptied in a controlled manner by actuating control valve 52, the resulting volumetric flow generally depending on the properties of switching valve 56 and generally being much greater than the volumetric flow during the preceding filling of hydraulic accumulator 10.

Figure 6:
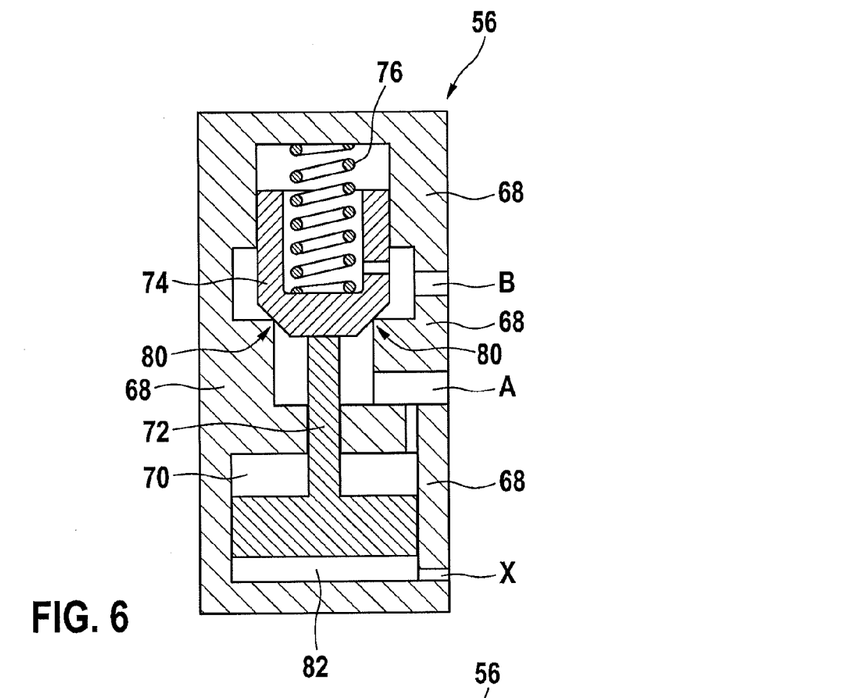
FIG. 6 shows a schematic representation of a first specific embodiment of an unblockable check valve in the above specific embodiments.

FIG. 6 shows a first specific embodiment of first check valve 56 in a schematic sectional representation. In the present case, multiple housing sections 68 are shown, which surround, among other things, a fluid chamber 70. First check valve 56 furthermore includes a piston 72, which is designed as a single piece together with a piston rod. In FIG. 6, piston 72 is vertically movable. An end section of the piston rod rests on a valve element 74, which is also vertically movable in the drawing. Valve element 74 is pressed against piston 72 by a spring 76, which in the present case is a pressure-loaded helical spring.

In the state shown in FIG. 6, valve element 74 rests on a valve seat 80 which is formed by housing sections 68, whereby, in the present case, system-side port A is hydraulically separated from accumulator-side port B.

The non-hatched areas of first check valve 56 in the drawing in FIG. 6 include fluid chamber 70. A lower piston chamber 82, which may exchange fluid via control port X, is located in a lower area in the drawing. At a higher pressure at accumulator-side port B with regard to system-side port A, first check valve 56 initially remains blocked, which is also supported by the force of spring 76. However, if a sufficient hydraulic pressure is applied to lower piston chamber 82 via control port X with the aid of control valve 52 (which is not illustrated in FIG. 6), piston 72 may be pushed upward vertically in the figure. Valve element 74 lifts off valve seat 80, whereby first check valve 56 is unblocked.

Figure 7:
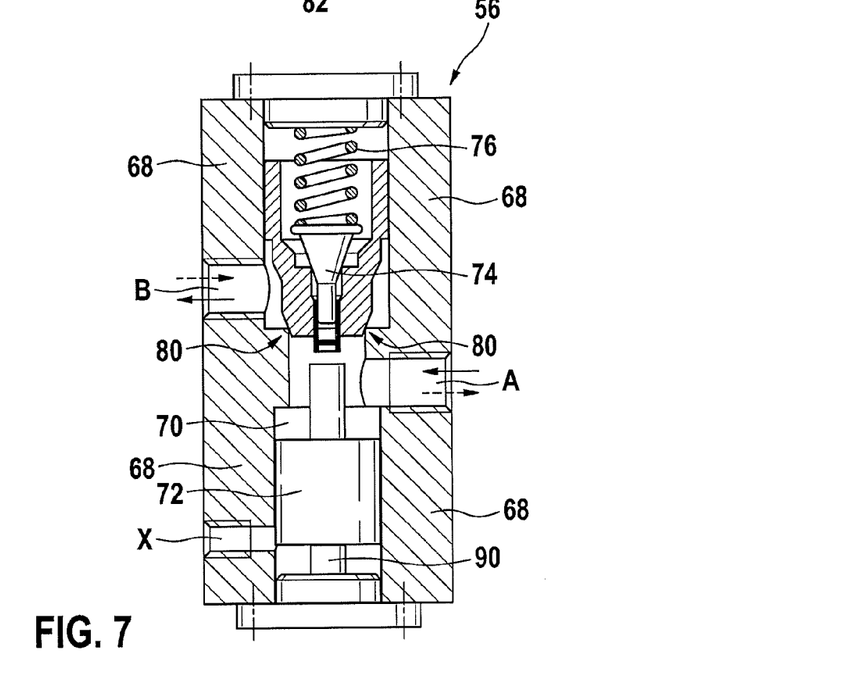
FIG. 7 shows a schematic representation of a second specific embodiment of the unblockable check valve.

FIG. 7 shows another specific embodiment of first check valve 56, whose structure and function are similar to the schematic illustration in FIG. 6. The elements of check valve 56 in FIG. 7 may be referenced by the corresponding elements in FIG. 6 based on their reference numerals. In addition, check valve 56 in FIG. 7 has a piston stop 90 in the lower part of the figure.

Figure 8:
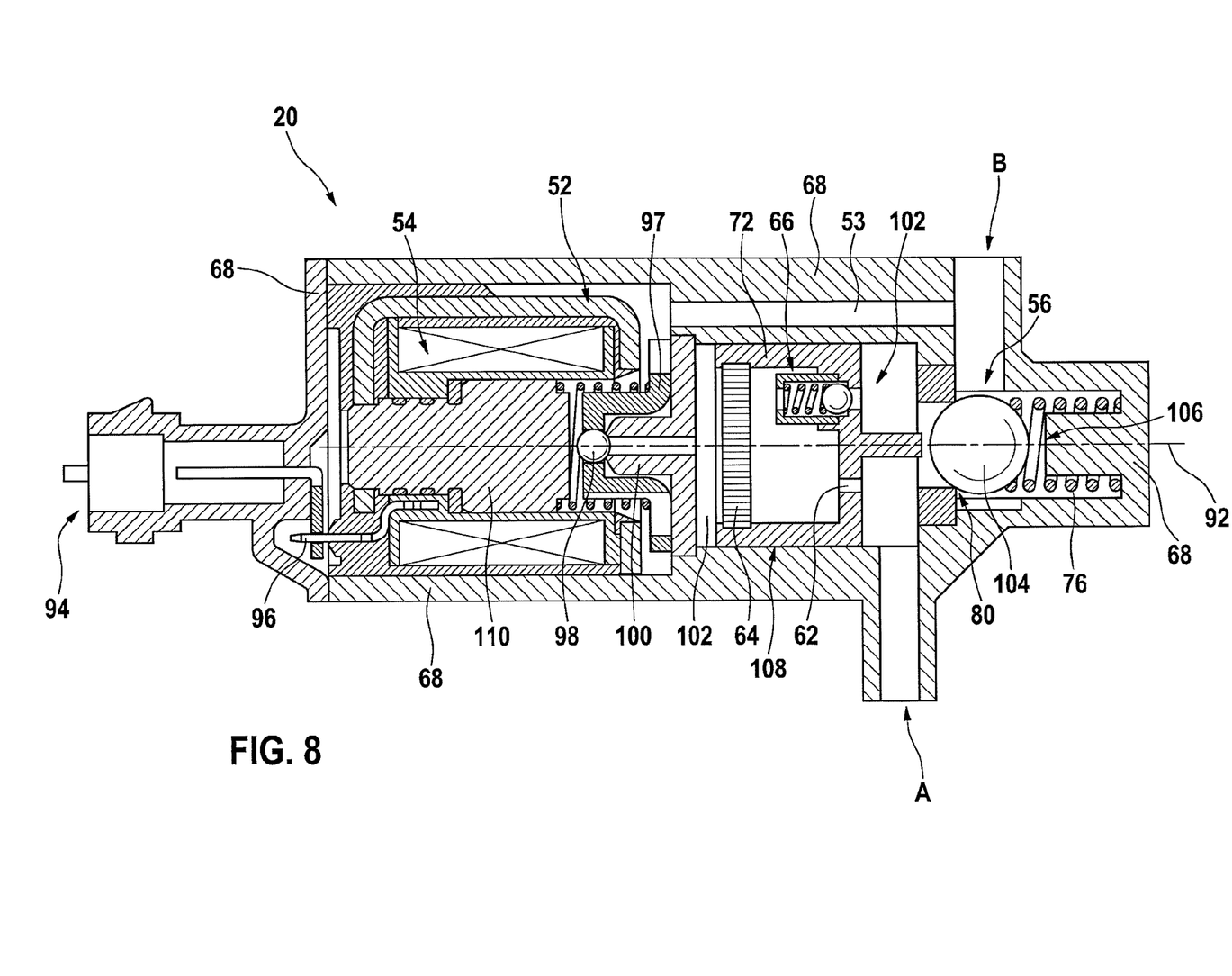
FIG. 8 shows a sectional representation of the device, similar to FIG. 5.

FIG. 8 shows a device 20 which is electrically actuatable by a transmission control unit of a motor vehicle and which controls the access to hydraulic accumulator 10. The functionality of device 20 in FIG. 8 generally corresponds to the function of device 20 illustrated in FIG. 5, some elements of device 20 in FIG. 8 being differently situated than those in FIG. 5.

Device 20 includes a number of housing sections 68, in which a number of elements are situated. Device 20 is generally situated rotationally symmetrically to a line 92 which is situated horizontally in the figure in FIG. 8.

Device 20 in FIG. 8 includes the following elements, among others, from left to right in the drawing: a plug connector 94, an electrical contact 96 and electromagnet 54, which may actuate control valve 52. Control valve 52 includes a valve ball 98, which is situated in an armature 97, and a washer 100. Piston 72, which in the present case is also referred to as an "unblocking piston," is movably situated in the direction of line 92 in a fluid chamber 102. In the present case, piston 72 is designed in such a way that filter 64, check valve 66 and throttle 62 are structurally integrated into piston 72. Throttle 62 is designed as a bore in piston 72. The right-hand area of the drawing in FIG. 8 shows first check valve 56, which includes a valve ball 104 which is pressed against valve seat 80 by spring 76. A stop 106, which forms part of a housing section 68, is illustrated to the right of valve ball 104 in the drawing.

Bypass channel 53 is implemented by a longitudinal bore running in the direction of line 92 in a housing section 68 between accumulator-side port B and control valve 52. A gap seal 108 between a lateral surface of piston 72 and a housing section 68 allows piston 72 to slide into the housing of device 20.

In the present case, the housing or housing sections 68 of device 20 illustrated in FIG. 8 are made of plastic in an injection molding method. Valve ball 104 is guided into the housing with the aid of injection-molded guides. Valve seat 80 is pressed in after spring 76 and valve ball 104 have been introduced.

In the present case, piston 72 is also cost-effectively made of plastic in an injection molding method, only comparatively minor tolerance requirements having to be met because piston 72 is situated in a non-critical path in device 20 of FIG. 8 with regard to possible leaks during the "accumulator holding phase." However, it may be necessary for the leaks occurring along gap seal 108 to be smaller than a fluid flow passing through throttle 62. This may be implemented by correspondingly reworked, pressed-in or injected sleeves. Attention must be paid to the correct combination of materials; for example, it is advantageous if the coefficients of thermal expansion of the materials used are at least approximately the same.

In the present case, filter 64 is designed in the shape of a disk. As illustrated in the figure, filter 64 may be situated in piston 72, or it may be situated in fluid chamber 102 between piston 72 and washer 100. Alternatively, filter 64 may also have a different design; for example, it may be designed as an annular filter. Washer 100 is injection-molded from plastic and pressed into armature 97, whereby it may be necessary to carry out a seal welding with the aid of a suitable method. An opening distance between piston 72 and washer 100 influences the noise and the load on device 20 and is preferably minimized.

Control valve 52 in the present case is pressed in, and housing sections 68, which do not necessarily need to form a single piece with the housing, are press-molded or welded to remaining housing sections 68, for example to meet requirements for the tightness of device 20. Alternatively, check valve 66 may also be situated in a bypass channel, which is not illustrated in FIG. 8, to system-side port A—for example, by press-fitting—instead of being situated in piston 72.

Spring 76 and throttle 62 may be easily adapted to the present requirements of hydraulic system 12. During operation, electromagnet 54 may be energized with regard to the point in time and duration of activation, matching a particular hydraulic system 12.

If electromagnet 54 is de-energized, and a pressure at accumulator-side port B is higher than a hydraulic pressure at system-side port A, valve ball 104 may be pressed against valve seat 80 to the left in the drawing, with the aid of spring 76. This closes check valve 56.

When the pressure at system-side port A increases in comparison with the pressure at accumulator-side port B, check valve 56 may open if the hydraulic pressure at system-side port A may hold valve ball 104 steady against the force of spring 76. This enables hydraulic accumulator 10 to be filled. However, this operation is generally dependent on the properties of spring 76.

If the hydraulic pressure in hydraulic system 12 subsequently drops at system-side port A with regard to the pressure at accumulator-side port B, for example if hydraulic pump 28 of the motor vehicle is not operated during a stopping phase of the internal combustion engine, check valve 56 remains closed. This means that the hydraulic pressure prevailing in hydraulic accumulator 10 is initially maintained.

If the internal combustion engine is to be subsequently started up after the internal combustion engine has stopped, electromagnet 54 may be energized shortly before and/or during the starting operation of the internal combustion engine. This allows armature 97 and washer 100 to be pulled to the left in the drawing by a magnet core 110, so that fluid may penetrate fluid chamber 102 starting from accumulator-side port B via bypass channel 53 and past washer 100. Since, according to the requirements, the hydraulic pressure at accumulator-side port B is higher than the hydraulic pressure at system-side port A, piston 72 is subsequently pushed to the right in the drawing, whereby it loads and carries along valve ball 104 to the right in the drawing, against the force of spring 76. This unblocks check valve 56, valve ball 104 being lifted off valve seat 80. Fluid may subsequently flow out of hydraulic accumulator 10 into remaining hydraulic system 16, where it may increase the hydraulic pressure and raise the volume of fluid present therein.

Check valve 66 furthermore makes it possible to also fill hydraulic accumulator 10 in a controlled manner as needed. At an adequate pressure difference between remaining hydraulic system 16 and hydraulic accumulator 10, control valve 52 is actuatable, after which check valve 66 may open and hydraulic accumulator 10 may be filled.

It is understood that the valve elements of control valve 52 and/or first check valve 56, i.e., valve ball 98 and valve ball 104, may also have a geometry other than the illustrated ball shape.

The following FIGS. 9 through 12 show schematic representations of the structure and function of device 20. This device is similar to devices 20 illustrated in FIGS. 5 and 8.

Figure 9:
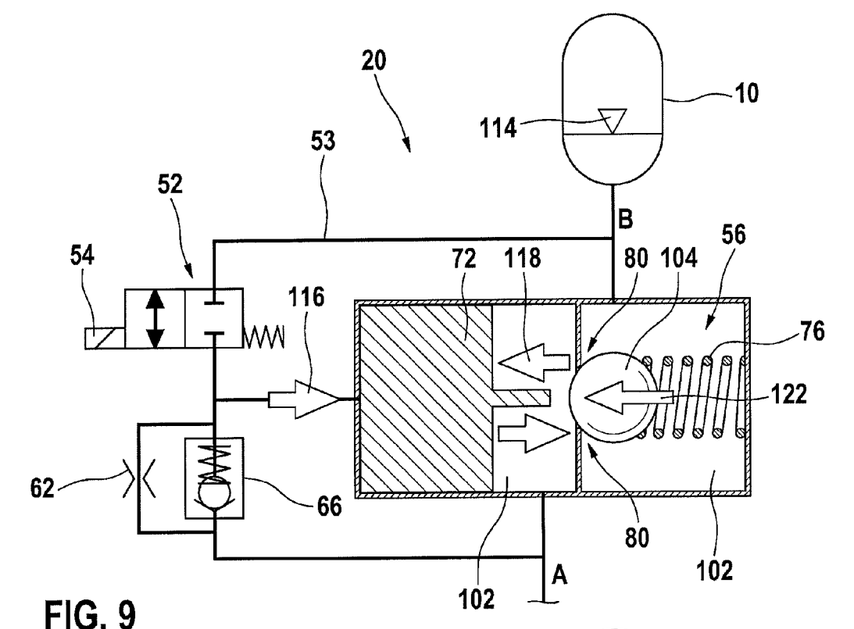
FIG. 9 shows a functional schematic representation of a device, similar to FIG. 5, for a first operating state.

FIG. 9 shows device 20 and hydraulic accumulator 10 in a basic state. Hydraulic accumulator 10 in the present case is emptied to a residual quantity of the fluid, which is indicated by an arrow 114. Piston 72 (unblocking piston) is pressed to the left in the drawing in FIG. 9 against a stop (without a reference numeral). A pressure compensation may take place via throttle 62 or check valve 66. Control valve 52 is de-energized and closed.

In the present case, a hydraulic pressure at system-side port A is greater than at accumulator-side port B. Piston 72 remains in the present state because a force 116 is smaller than a force 118 acting upon piston 72 from the right in the drawing. Spring 76 is dimensioned in such a way that it is able to press valve ball 104 securely against valve seat 80 under the present operating conditions. It is apparent that, as a result of closed check valve 56 and closed control valve 52, neither filling nor emptying of hydraulic accumulator 10 takes place in FIG. 9.

Figure 10:
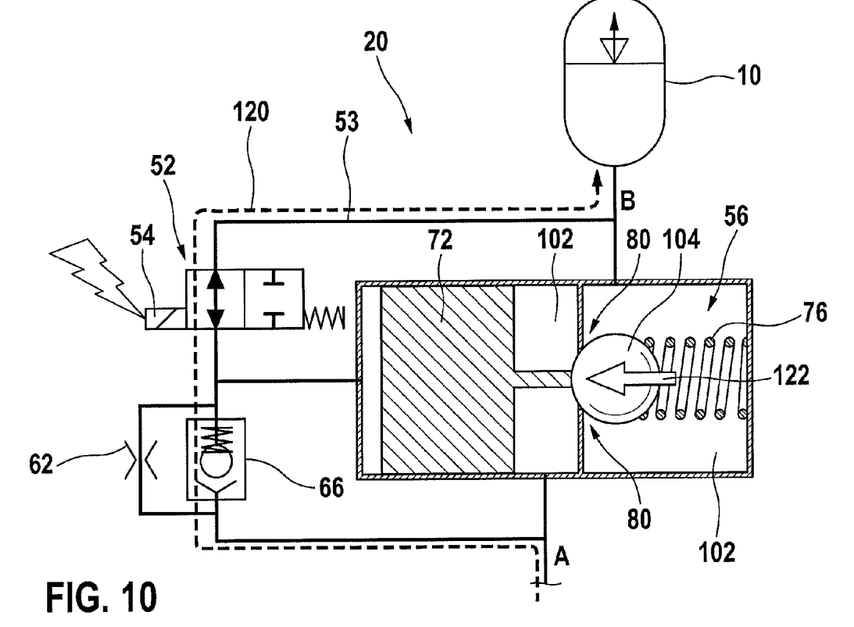
FIG. 10 shows a schematic representation, similar to FIG. 9, for a second operating state.

FIG. 10 shows a subsequent state of device 20 in relation to FIG. 9, in which electromagnet 54 is energized. A hydraulic pressure at system-side port A is again higher than at accumulator-side port B. As illustrated by a dashed line 120 in the figure in FIG. 10, control valve 52 opens and a fluid flow may pass from system-side port A via check valve 66 and throttle 62 as well as via opened control valve 52 via bypass channel 53 into hydraulic accumulator 10, which is continuously filled thereby. Second check valve 66 opens, so that the fluid flow passing along dashed line 120 is generally limited by the opening cross section of control valve 52.

In the present case, force 122 of spring 76 is so high with regard to the hydraulic pressure condition and the force exerted by piston 72 on valve ball 104 that valve ball 104 may continue to rest on valve seat 80, and first check valve 56 thus remains blocked. FIG. 10 thus shows the filling phase of hydraulic accumulator 10.

Figure 11:
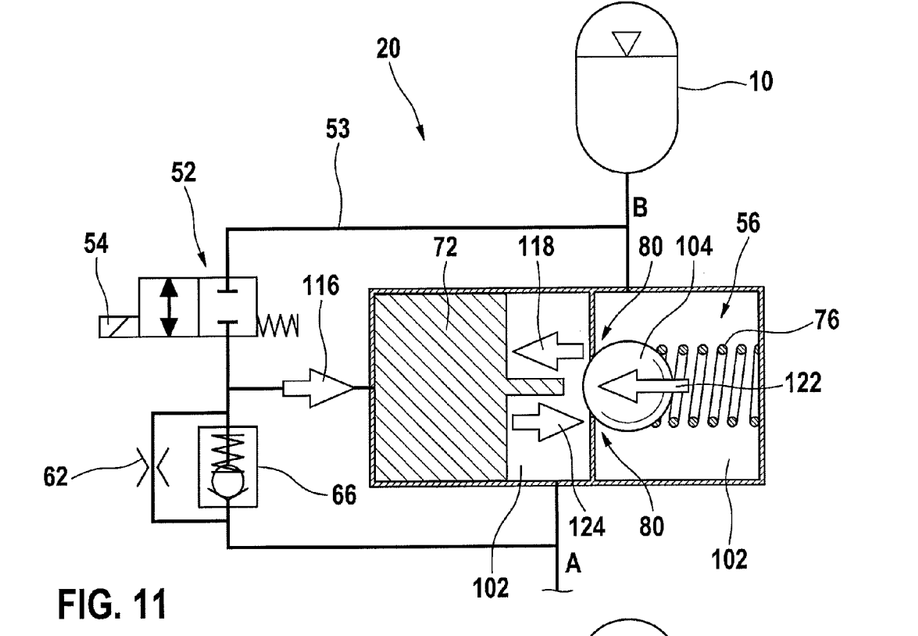
FIG. 11 shows a schematic representation, similar to FIG. 9, for a third operating state.

FIG. 11 shows a subsequent state of device 20 in reference to FIG. 10. Hydraulic accumulator 10 is filled with fluid up to an upper limit. The current flowing through electromagnet 54 is switched off and control valve 52 closed. In the present case, the hydraulic pressure at system-side port A may be greater, equal or less than at accumulator-side port B.

First check valve 56 remains closed under the conditions illustrated in FIG. 11, since force 122 of spring 76 in reference to the pressure difference resulting at valve ball 104 and possibly in reference to a force exerted by piston 72 remains sufficient to press valve ball 104 against valve seat 80. Piston 72 rests against its left stop, as shown in the drawing in FIG. 11; however, it is possible for piston 72 to be pressed to the right, deviating from the figure, the resulting force nevertheless keeping first check valve 56 closed, as described above. FIG. 11 thus shows the holding phase of hydraulic accumulator 10.

Figure 12:
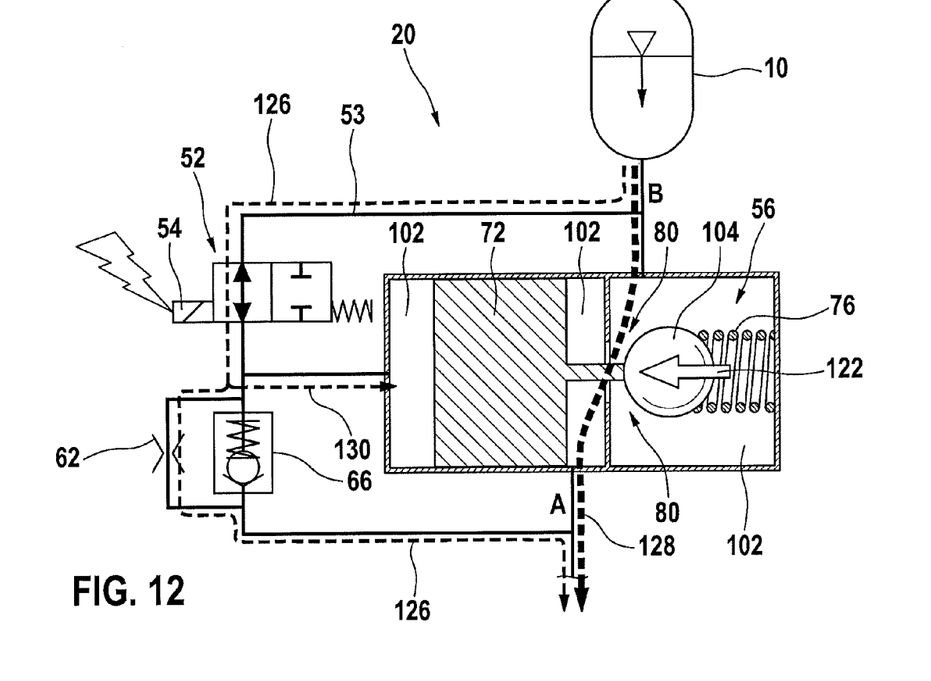
FIG. 12 shows a schematic representation, similar to FIG. 9, for a fourth operating state.

FIG. 12 shows a state of device 20 which follows FIG. 11. An emptying phase of hydraulic accumulator 10 into remaining hydraulic system 16 is illustrated. In the present case, electromagnet 54 is energized so that control valve 52 may open. In the present case, the hydraulic pressure at system-side port A is lower than the hydraulic pressure at accumulator-side port B, so that first check valve 56 would remain closed without the current feed to electromagnet 54.

Once control valve 52 opens, pressure from hydraulic accumulator 10 is applied to a fluid chamber 102 to the left of piston 72 in the figure, according to an arrow 130. Piston 72 subsequently presses to the right in the figure against valve ball 104 under a comparatively great force. A diameter of piston 72 in the present case is approximately three times to four times the size of a diameter of valve seat 80. As a result, valve ball 104 is lifted off valve seat 80, so that first check valve 56 may open. Due to the comparatively small effective cross section of throttle 62—and consequently a small outflow of fluid toward system-side port A—it is achieved that first check valve 56 may open for a sufficiently long period of time.

A comparatively weak fluid flow subsequently results through throttle 62 along dashed line 126, and a comparatively strong fluid flow results along dashed line 128 from accumulator-side port B through opened first check valve 56 to system-side port A. This makes it possible to fill remaining hydraulic system 16 (not illustrated) connected to system-side port A with fluid and a corresponding hydraulic pressure or to apply these media thereto.

Figure 13:
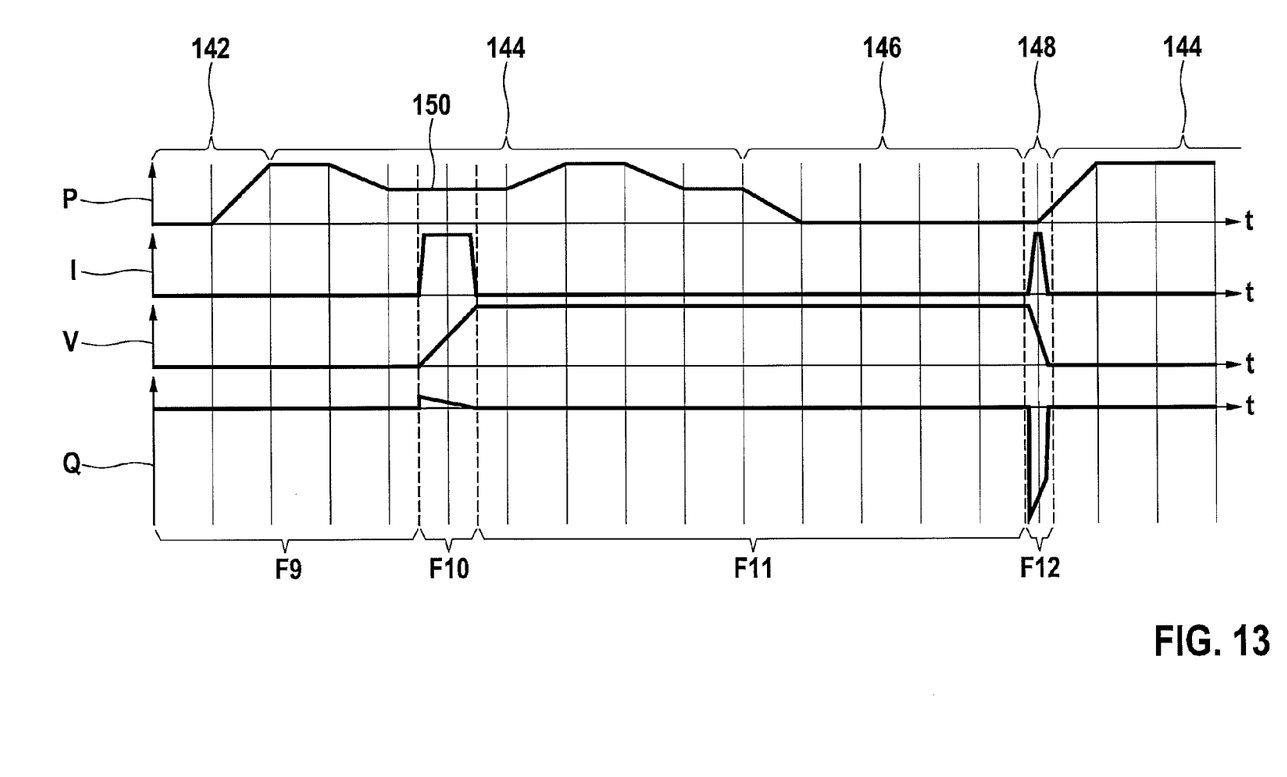
FIG. 13 shows four timing diagrams having different operating states of the hydraulic accumulator, corresponding to FIGS. 9 through 12.

FIG. 13 shows four timing diagrams, which are situated vertically above each other, for different operating states of hydraulic accumulator 10. The four timing diagrams have the same time scale t in relation to each other. In the figure, the following are shown from top to bottom: a pump pressure P of hydraulic pump 28, a current I of electromagnet 54, a stored fluid volume V of hydraulic accumulator 10 and a volumetric flow Q at accumulator-side port B.

In a lower area of the figure, four sections F9, F10, F11 and F12 are indicated, each of which refers to an operating state of device 20 according to FIGS. 9, 10, 11 and 12. They each therefore correspond to a basic state, a filling phase, a holding phase and an emptying phase of hydraulic accumulator 10.

Operating states of the motor vehicle are indicated in chronological sequence in an upper area of the figure: an initial start 142, a normal vehicle operation 144, a stop 146, for example at a traffic light, a restart 148 and another normal vehicle operation 144. A charging pressure 150 of hydraulic pump 28 is reached in the first section of normal vehicle operation 144.

An initial start 142 of the motor vehicle and subsequently a normal vehicle operation 144 take place in section F9. Hydraulic accumulator 10 is empty, and no exchange of fluid takes place via accumulator-side port B. In this state, hydraulic pump 28 builds up a pump pressure P, which adjusts to charging pressure 150. Electromagnet 54 is de-energized.

A filling of hydraulic accumulator 10 takes place during normal vehicle operation 144 in section F10. For this purpose, electromagnet 54 is energized in the present case for a period of approximately 3 seconds. An initially comparatively high volumetric flow Q of approximately 2 l/min to approximately 3 l/min (liters per minute) takes place in hydraulic accumulator 10, volumetric flow Q becoming steadily smaller as a result of the decreasing pressure difference between system-side port A and accumulator-side port B. Hydraulic accumulator 10 is subsequently filled to an upper limit.

A transition from normal vehicle operation 144 to stop 146 takes place in section F11. No exchange of fluid takes place via accumulator-side port B, i.e., fluid volume V stored in hydraulic accumulator 10 is maintained.

A restart 148 of the internal combustion engine takes place in section F12. Electromagnet 54 is energized, for example, for 0.3 seconds, and a comparatively rapid emptying of hydraulic accumulator 10 (compared to the filling phase) takes place via system-side port A, for example at a rate of approximately 30 l/min. Remaining hydraulic system 16 subsequently has a pressure which is sufficient for normal vehicle operation 144, and hydraulic accumulator 10 is essentially emptied. The curve of volumetric flow Q has a comparatively short but steep negative excursion in Section F12.

The particular functionality of device 20 during sections F9 through F12 was explained in detail above in the associated FIGS. 9 through 12 and will not be repeated here.

What is claimed is:

1. A device for controlling a hydraulic accumulator of a hydraulic system, comprising:
a valve device which connects and disconnects an accumulator-side port of the device to and from a system-side port, the valve device including at least one first check valve which is situated hydraulically between the accumulator-side port and the system-side port and which is blocking in a direction of the system-side port, and further including an electrically actuated control valve which is situated between a control port of the first check valve and the accumulator-side port in such a way that the control valve may hydraulically unblock the first check valve, using the pressure prevailing at the accumulator-side port; and
a second check valve in line with the first check valve, the second check valve being situated between the first check valve and the system-side port and which is blocking in a direction of the first check valve; and
a bypass situated in parallel to the second check valve in which a volumetric flow-limiting element is situated.

2. The device as recited in claim 1, wherein the hydraulic system is a vehicle transmission.

3. The device as recited in claim 1, wherein the volumetric flow-limiting element is one of a flow throttle or a diaphragm.

4. A device for controlling a hydraulic accumulator of a hydraulic system, comprising:
a valve device which connects and disconnects an accumulator-side port of the device to and from a system-side port, the valve device including at least one first check valve which is situated hydraulically between the accumulator-side port and the system-side port and which is blocking in a direction of the system-side port, and further including an electrically actuated control valve which is situated between a control port of the first check valve and the accumulator-side port in such a way that the control valve may hydraulically unblock the first check valve, using the pressure prevailing at the accumulator-side port; and
a hydraulic connection which connects the control port of the first check valve to the system-side port, a volumetric flow-limiting element, and a filter serially situated in the hydraulic connection; and
a second check valve situated in parallel to the volumetric flow-limiting element, which is blocking in the direction of the system-side port.

5. The device as recited in claim 4, wherein the volumetric flow-limiting element is one of a throttle or a diaphragm.

6. The device as recited in claim 4, wherein the second check valve and the volumetric flow-limiting element are situated in a valve element of the first check valve or in a bypass channel of the first check valve.

7. The device as recited in claim 4, wherein one of a spring piston accumulator, a gas piston accumulator, or a gas diaphragm accumulator having a barrier layer, is connectable to the accumulator-side port.

8. The device as recited in claim 4, wherein the control valve is blocked in the de-energized state.

9. A control device, the control device designed to regulate a device for controlling a hydraulic regulator of a hydraulic system, the device including: a valve device which connects and disconnects an accumulator-side port of the device to and from a system-side port, the valve device including at least one first check valve which is situated hydraulically between the accumulator-side port and the system-side port and which is blocking in a direction of the system-side port, and further including an electrically actuated control valve which is situated between a control port of the first check valve and the accumulator-side port in such a way that the control valve may hydraulically unblock the first check valve, using the pressure prevailing at the accumulator-side port; and a hydraulic connection which connects the control port of the first check valve to the system-side port, a volumetric flow-limiting element, and a filter serially situated in the hydraulic connection; and a second check valve situated in parallel to the volumetric flow-limiting element, which is blocking in the direction of the system-side port.

* * * * *